United States Patent [19]

Feigel

[11] Patent Number: 5,860,631
[45] Date of Patent: Jan. 19, 1999

[54] PILOT VALVE FOR SUSPENSION CONTROL SYSTEMS

[75] Inventor: Hans-Jörg Feigel, Rosbach, Germany

[73] Assignee: ITT Automotive Europe GmbH, Germany

[21] Appl. No.: 325,416

[22] PCT Filed: Mar. 13, 1993

[86] PCT No.: PCT/EP93/00576

§ 371 Date: Dec. 21, 1994

§ 102(e) Date: Dec. 21, 1994

[87] PCT Pub. No.: WO93/22582

PCT Pub. Date: Nov. 11, 1993

[30] Foreign Application Priority Data

Apr. 27, 1992 [DE] Germany .......................... 41 13 803.5

[51] Int. Cl.⁶ ............................ F16K 31/04; F16K 31/08
[52] U.S. Cl. ........................ 251/30.03; 251/46; 251/65;
251/129.15; 188/299; 280/707; 280/714
[58] Field of Search ..................... 251/30.02, 30.01,
251/30.05, 65, 30.03, 30.04, 45, 46, 129.15;
188/299; 280/707, 714

[56] References Cited

U.S. PATENT DOCUMENTS

| | | | |
|---|---|---|---|
| 1,862,937 | 6/1932 | Littlefield | 251/30.03 |
| 2,301,581 | 11/1942 | Ray | 251/30.03 |
| 3,208,716 | 9/1965 | Rolfe | 251/30.03 |
| 3,362,679 | 1/1968 | Le Wan | 251/30.03 |
| 3,593,957 | 7/1971 | Dolter et al. | 251/30.03 |
| 3,738,607 | 6/1973 | Peruglia | 251/30.03 |
| 3,994,318 | 11/1976 | Ishigaki | 251/30.03 |
| 4,948,090 | 8/1990 | Chen | 251/30.03 |
| 4,967,996 | 11/1990 | Sonoda et al. | 251/45 |
| 5,069,420 | 12/1991 | Stobbs et al. | 251/30.02 |
| 5,163,706 | 11/1992 | Maguran et al. | 251/30.02 |
| 5,282,645 | 2/1994 | Spakowski et al. | 251/30.02 |

FOREIGN PATENT DOCUMENTS 3719113  6/1987  Germany .

OTHER PUBLICATIONS

International Search Report for Application PCT/EP93/00576 filed 13 Mar. 1993.

International Examination Report for Application PCT/EP93/00576 filed 13 Mar. 1993 With Annexes and an English Translation.

*Primary Examiner*—George L. Walton
*Attorney, Agent, or Firm*—J. Gordon Lewis; Thomas N. Twomey

[57] ABSTRACT

A two-stage pilot valve for suspension control systems. The valve includes an annular pilot member so that fluid discharges in a radial direction, and it is preferable that the valve member is comprised of a resiliently suspended plate.

Both the dynamic characteristics of the valve and its function in some respects (minimum opening pressure for the main stage) are improved due to these provisions.

34 Claims, 4 Drawing Sheets

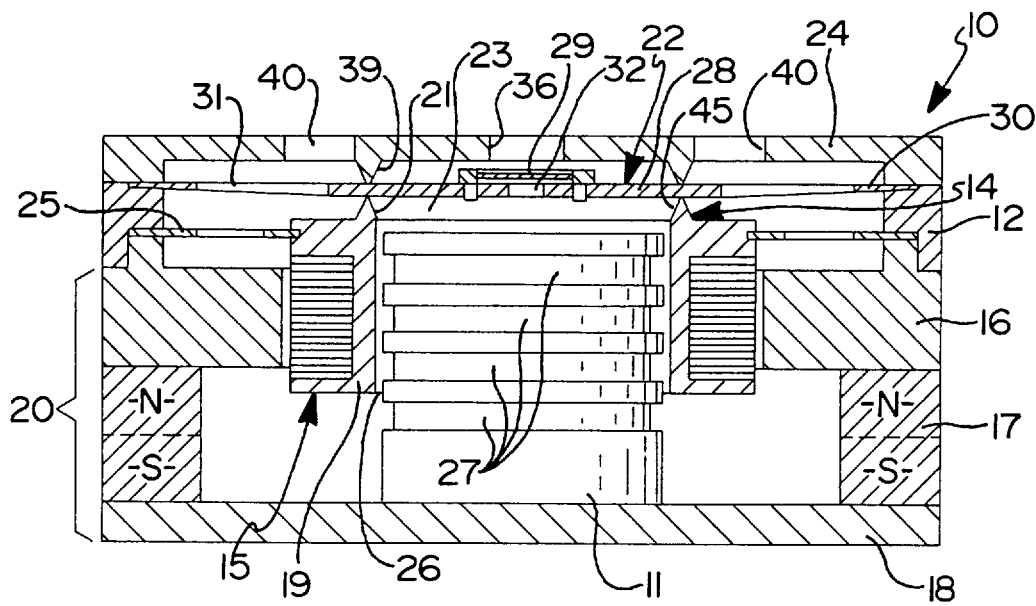

FIG 6
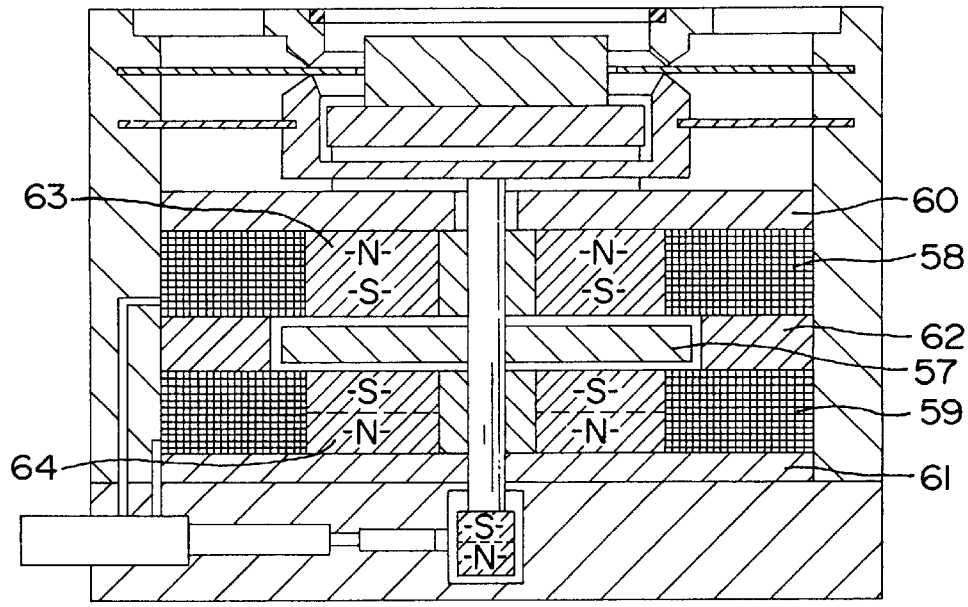
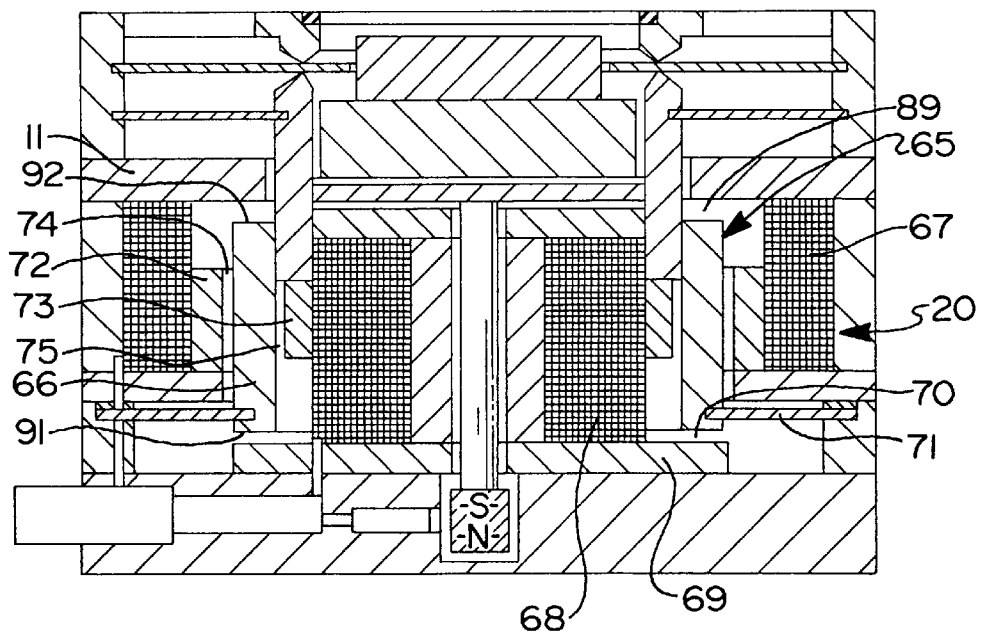
FIG 7

PILOT VALVE FOR SUSPENSION CONTROL SYSTEMS

TECHNICAL FIELD

The present invention relates to pilot valves and more particularly to pilot valves for suspension control systems.

BACKGROUND OF THE INVENTION

A valve of this general type is disclosed in German patent specification 37 19 113. The above referenced valve which is intended for use as an absorber valve in a controllable vibration absorber to adjust the force absorbed by the vibration absorber, is substantially composed of a main stage (which is formed of a valve member interacting with a sealing seat and having a first, constant throttling cross-section) and a pilot stage configured in a second throttling cross-section in the valve member, and is infinitely variably controlled by means of a control needle operable by an electromechanical transducer.

One of the disadvantages of the above-referenced valve is its considerable overall length and its high manufacturing costs. Further, the dynamic characteristics of the above referenced valve are considered poor and rendering a valve of this type ineffective for application in suspension control systems.

Therefore, an object of the present invention is to provide a pilot valve of the type previously mentioned, the novel construction of which allows its overall length to be shortened and its manufacturing costs to be reduced. In addition, it is desirable to improve the dynamic characteristics of the valve and its function (minimum opening pressure for the main stage).

This object is achieved according to the present invention in that the pilot member has an annular design so that fluid discharges in a radial direction, and in that the valve member is a resiliently suspended plate. Such a valve design is very compact. The excellent dynamic characteristics of the valve is due to the annular design of the pilot member, rendering large flow cross-sections possible.

SUMMARY OF THE INVENTION

According to a favorable aspect of the present invention, the reliability in operation is augmented by the pilot member being guided on a preferably cylindrical guide element which is fixedly arranged in the valve housing.

Further, advantageously, radial pressure relief grooves are provided in the guide element which open into a slot provided between the pilot member and the guide element. This provision prevents a hydraulic jamming effect in this area.

According to another favorable aspect of the present invention, the valve member has an opening which receives an axial cylindrical extension of the guide element, the first throttling cross-section being formed by the annular slot confined between the valve member and the extension.

The manufacture of the valve according to the present invention is simplified in another embodiment of the invention by the first throttling cross-section being formed by an opening in the valve member which is preferably arranged centrally.

In another embodiment of the present invention, the slot provided between the pilot member and the guide element is properly supplied with filtered pressure fluid by a filter element which is connected upstream of the first throttling cross-section. This eliminates the risk of malfunction due to the imminent ingress of contaminants in this area.

In another favorable aspect of the present invention, the radially outwardly disposed annular fringe area of the plate is provided as a bending spring. Due to the one-part design of the valve member with its suspension or support, a spring without bias and with a great amount of rigidity is achieved.

To ensure that the function of the valve according to the present invention is preserved even upon failure of the electromechanical transducer (so-called fail-safe function), according to still another aspect of the present invention, the pilot member is suspended on a bending spring compressed in the valve housing. This provision is expedient in particular in connection with bidirectional transducers. The bending spring may be configured as a spring plate with apertures.

The risk of soiling is diminished to a still greater extent in another design of the valve according to the present invention in that an annular groove is provided proximate the first throttling cross-section.

In another favorable aspect of the present invention, the plate has annular projections both in the range of effect of a sealing seat, controlling the first hydraulic connection, and in the range of effect of the pilot member. The provision of the projections permits realizing a progressive flow characteristic curve which contributes to stabilizing the valve behavior.

In still another favorable aspect of the present invention, a very effective sealing effect of the pilot stage is achieved by the area of the pilot member, which interacts with the valve member, forming a control edge of a triangular cross-section.

An application of the valve according to the present invention as a pressure limiting valve is achieved in that the area of the pilot member interacting with the valve member has a surface, to which the pressure prevailing in the pilot chamber is applied, while its application as a throttling valve becomes possible by the pilot member being pressure-balanced.

To ensure in a simple and low-cost manner that pressure balance does not occur at the pilot member during operation, according to a favorable improvement upon the object of the present invention, a preferably cylindrical part, interacting with the pilot member, is provided, the end surface of which may be subjected to the pressure prevailing in the pilot chamber. The pressurized surface of the cylindrical part may be realized with large-size tolerances.

Further improvement of the dynamic characteristics of the valve according to the present invention is achieved in another advantageous design variant by using an electromechanical transducer formed from a plunger coil, which interacts with a permanent magnet and the carrier of which forms the pilot member. In addition, this permits reducing the necessary number of component parts.

According to another advantageous aspect of the design of the present invention, the electromechanical transducer is a bidirectional acting, linear motor, the armature of which is of sleeve-shaped design and mounted in a sliding bushing such that axial air slots are provided between its ends and the guide element or a pole plate which closes the valve housing. The chamber, bounded radially by the armature, accommodates two axially magnetized permanent magnets which are separated by a pole shoe, one of the permanent magnets abutting against the pole plate, while the other one abuts against the guide element, a radial air slot being provided between the pole shoe and the armature. The result of these provisions is that greater actuating forces are applicable, thereby reducing the effect of disturbing forces. Due to the sleeve-shaped armature configuration and its small resulting size, a favorable dynamic characteristics is achieved, and the short guiding length of the armature provides a particularly compact structure of the valve according to the present invention.

According to another aspect of the present invention, the force-stroke characteristic curve may be made linear by the axial air slots being of stepped design in a radial direction.

In another favorable embodiment of the present invention, the armature is connected to the pilot member by means of connecting pins which extend through the guide element. Only minor disturbances of the magnetic flux field occur in this design.

According to another aspect of the present invention, the electromechanical transducer is a double lifting magnet, the armature of which cooperates with coils, radially embracing the armature, each one pole plate and a pole shoe interposed in between, all elements being arranged side by side in an axial direction.

The energy density is enhanced to a major degree in another preferred embodiment by the coils radially embracing two annular permanent magnets, magnetized in axially opposite directions, the armature being interposed between the permanent magnets. The necessary mounting space is reduced due to this measure.

The existing mounting space is utilized to a greater extent and, additionally, the movable mass is reduced, according to a favorable development of the present invention by the electromechanical transducer being arranged as a double lifting magnet, the armature of which is provided as a cylindrical sleeve, and the arrangement of its coils being such that one coil is positioned radially outside the sleeve, while the other coil is positioned radially inside the sleeve.

A low-friction, armature bearing (which serves as a pilot member) is achieved by the sleeve being suspended on a bending spring, the ends of the sleeve forming axial air slots with the guide element or a pole plate which interacts with the radially inwardly disposed coil. To minimize magnetic losses, the sleeve is interposed between pole cores, which radially abut against the coils, and forms radial air slots with the pole cores.

Due to a favorable embodiment of the present invention, it is possible to connect the valve according to the present invention into a position control circuit by connecting the pilot member to a measuring device which senses its actuating travel. As a result, dynamics may be enhanced still further, and the hysteresis is reduced.

It is preferred that the pilot member is connected to the measuring device by means of the previously mentioned cylindrical part so that the effect of the magnetic disturbances on the measuring device, which is positioned outside the electromechanical transducer, is minimized.

According to the features of one design of the present invention, which is inexpensive to manufacture and small in size, the measuring device senses variations in magnetic variables which are caused by the shifting pilot member.

It is preferred that the measuring device is a permanent magnet fitted to the pilot member or a part connected to it and a sensor element recording the variations of the magnetic field of the permanent magnet.

In another favorable improvement which is appropriate in particular for application at more elevated temperatures, the sensor element is a magnetoresistive element. However, the sensor element may also be formed from a Hall effect element.

A measuring device, which is reliable in operation irrespective of the effect of external magnetic fields, is provided by a reflecting light barrier.

A sturdy measuring device, which is not susceptible to contaminants, may also be provided as an arrangement working by the eddy-current principle.

BRIEF DESCRIPTION OF THE DRAWINGS

FIG. 2 is a magnified view of the valve of FIG. 1.

FIG. 3 is a view of a second embodiment of the pilot valve of the present invention.

FIG. 4 to FIG. 7 is a view of the second to fifth variant of the electromechanical transducer to be used with the valve of the present invention.

DETAILED DESCRIPTION OF THE PREFERRED EMBODIMENTS

Figure 1:
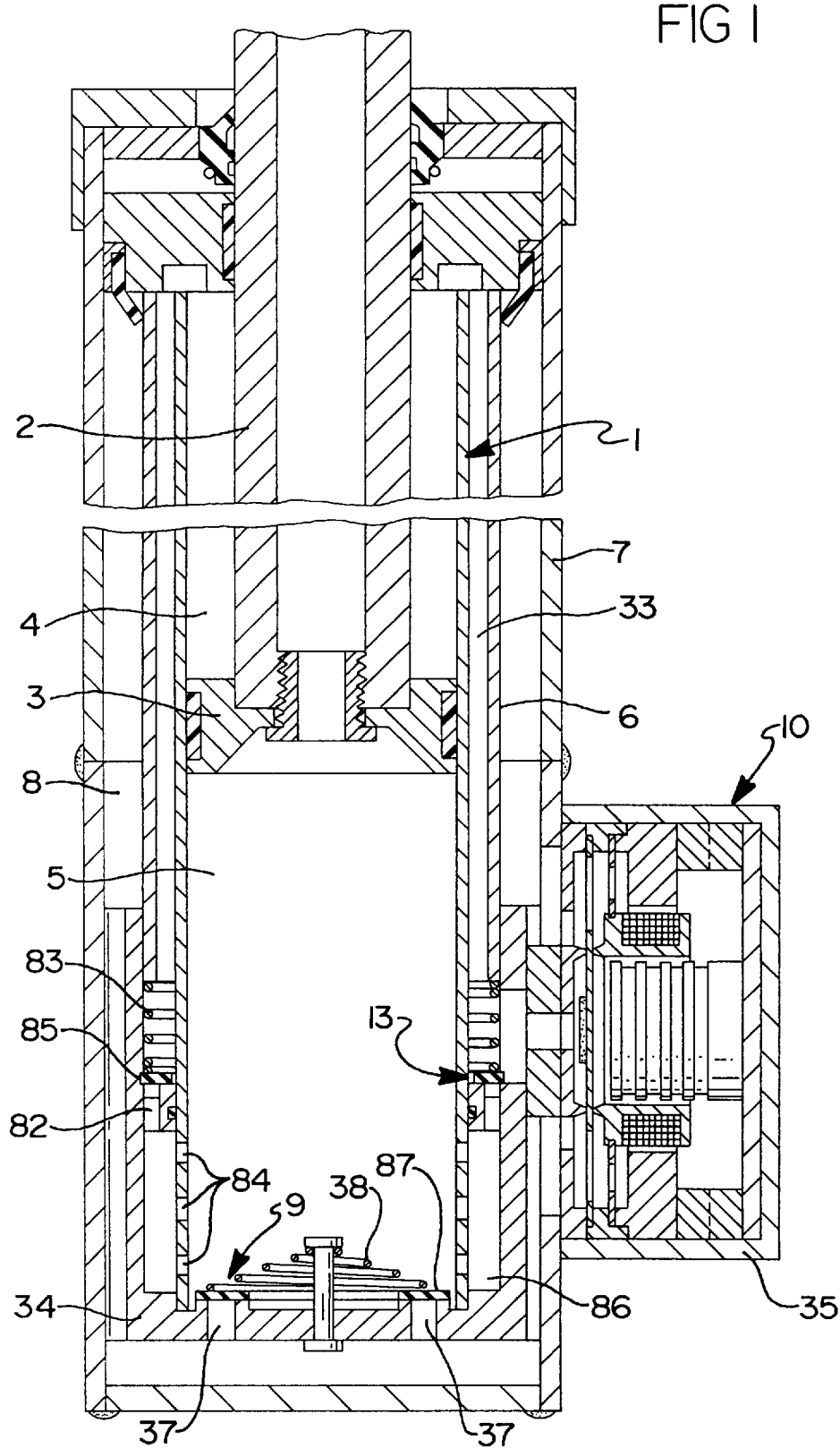
FIG. 1 is a diagrammatic cross-sectional representation of a first embodiment of the pilot valve of the present invention, which is incorporated as an absorber valve in a controllable vibration absorber.

The controllable vibration absorber, shown schematically in FIG. 1, has a working cylinder 1 and a pipe 6, arranged coaxially to the working cylinder 1, so that a connecting channel 33 is formed between them. Coaxially to the working cylinder 1 or the pipe 6, an external pipe 7 is positioned which defines, along with the pipe 6, a compensating chamber 8 which has a circular ring-shaped cross-section. The compensating chamber 8 is partly filled with oil and interacts with the connecting channel 33. By means of piston 3, which is slidable by a hollow piston rod 2, the internal space of the working cylinder 1 is subdivided into a first working chamber 4, which is positioned above the piston 3, and a second working chamber 5, which is positioned beneath the piston 3.

In the bottom range of the illustrated vibration absorber, there is a valve assembly, not described in detail, which is substantially composed of a non-return valve 9, effective in the rebound travel, a switch valve 13 which is constituted by a second non-return valve and effective in the compression travel, and a controllable absorber valve which as a whole, is assigned reference numeral 10. In this configuration, the two non-return valves 9, 13 are preferably arranged in a valve housing 34 which, additionally, accommodates the absorber valve 10.

The first non-return valve 9 includes a valve disc 87 which is prestressed by a spring 38, interacts with passages 37 provided in the valve housing 34 and which renders possible an intake of the oil from the compensating chamber 8 into the second working chamber 5 in the rebound travel. The switching valve or second non-return valve 13, to which the pressure existing in the second working chamber 5 may be applied, is formed by a valve disc 85 which is prestressed by a spring 83, is arranged radially outside by working cylinder 1 and interacts with passages 82 provided in the valve housing 34 and extending in an axial direction. In its lower range (in the lower final position of stroke of the piston 3), the working cylinder 1 is provided with openings 84 which can be passed over partly or entirely by the piston 3. Openings 84 open into an annular chamber 86 which is confined in a radial direction (and axially from beneath) by the housing 34 and in an axial direction by the second non-return valve 13.

The absorber valve 10, which is provided as a two-stage seat valve, is positioned within a valve housing 35 forming part of the housing 34. Valve 10 is preferably mounted vertically with respect to the longitudinal axis of the vibration absorber, and serves to vary the flow cross-section of the connection between the connecting channel 33 and the compensating chamber 8.

As is readily apparent from FIG. 1, on rebound or upward movement of piston 3, fluid is displaced from working chamber 4 to connecting channel 33. Fluid is blocked from passage into working chamber 5 from channel 33 by valve 13. Fluid displaced from chamber 4 must therefore pass through valve 10 to reach chamber 5 by way of chamber 8. Fluid enters valve 10 through inlet channel 36 and exits through outlet channel 40. Fluid exiting valve 10 on the rebound stroke passes to chamber 8, from which fluid enters chamber 5 through valve 9. Therefore, it is readily apparent that control of valve 10 provides control of the rebound rate.

With regard to jounce or downward movement of piston 3, fluid is supplied to working chamber 4 via channel 33. Channel 33 receives fluid displaced from working chamber 5 by piston 3. However, because the volume of fluid displaced from working chamber 5 is greater than that which can be received by working chamber 4, the residual oil passes from chamber 33 through valve 10 to compensating chamber 8. Fluid again passes into valve 10 through inlet channel 36 and out through outlet channel 40. Valve 10 is therefore able to control the rate of movement of piston 3 within the shock absorber.

As can be seen in FIG. 2, the absorber valve 10 has a substantially cylindrical guide element 11, on which a preferably sleeve-shaped pilot member 14 is guided forming the carrier 19 of an electric plunger coil 15 which, along with an annular pole shoe 16, a permanent magnet 17 and a bottom plate 18 abutted against the permanent magnet 17, forms an electromechanical transducer 20.

The area of the annular pilot member 14, which forms a control edge 21 triangular in cross-section, interacts with a valve member 22, thereby forming a pilot chamber 23 between the guide element 11 and the valve member 22 which is confined by the control edge 21. Preferably, the valve member 22 is configured as a plate 28, the radially outwardly disposed annular area of which is provided with apertures 31 and is configured as a bending spring 30 which is compressed into a cover 24, an inner part 12 of which is abutted against the pole shoe 16. The cover 24, which includes a centrally arranged opening 36 serving as an inlet channel and at least two openings 40, arranged in a radially offset manner and forming outlet channels, has on its side close to the valve member 22 an annular projection 39, which is preferably of a triangular cross-section, which forms a sealing seat and abuts against the valve member 22.

As can be seen in FIG. 1, the opening 36, in the assembled condition of the valve 10 according to the present invention, is connected to the connecting channel 33, while the openings 40 open into the compensating chamber 8. It is preferred that the valve member 22 has in its middle an opening 32, upstream of which a filter element 29 is connected, and which forms a first, constant throttling cross-section. A second, variable throttling cross-section is formed between the control edge 21 of the pilot member 14 and the valve member 22 due to the annular slot being opened when the plunger coil 15, retained on pilot member 14 by carrier 19, is energized. Preferably, the pilot member 14 is suspended on a disc-shaped bending spring 25 which, at its outside rim, is compressed between the cover 24 and the pole shoe 16. The guide element 11 and the valve member 14 are sized such that a radial slot 26 results between them. A plurality of pressure relief grooves 27, arranged side by side on the surface of the guide element 11, open into the slot 26. When it as desired to use the valve according to the present invention as a pressure relief valve, it is expedient that the area of the pilot member 14 abutting against the valve member 22 has a surface 45 which is exposed to the effect of the hydraulic pressure prevailing in the pilot chamber 23. When the valve according to the present invention is used as a throttling valve, the pilot member 14 is pressure-balanced. The plate 28 forming the valve member 22 may be provided with annular projections (not shown) on either sides in the range of effect of the sealing seat 39 and the control edge 21 of the pilot member 14, which projections permit realizing a progressive flow characteristic curve stablizing the valve behavior.

In the second preferred embodiment of the valve according to the present invention shown in FIG. 3, the guide element 11 has an axial cylindrical extension 41 which projects with radial clearance into an opening 42, centrally arranged in the valve member 22, so that an annular slot 43 is formed therebetween and forms the first throttling cross-section mentioned with respect to FIG. 2. Further it is expedient to arrange an annular groove 44 proximate the first throttling cross-section 43 which serves to clear the throttle from any dirt particles which may accumulate in front of the pilot chamber 23.

Figure 4:
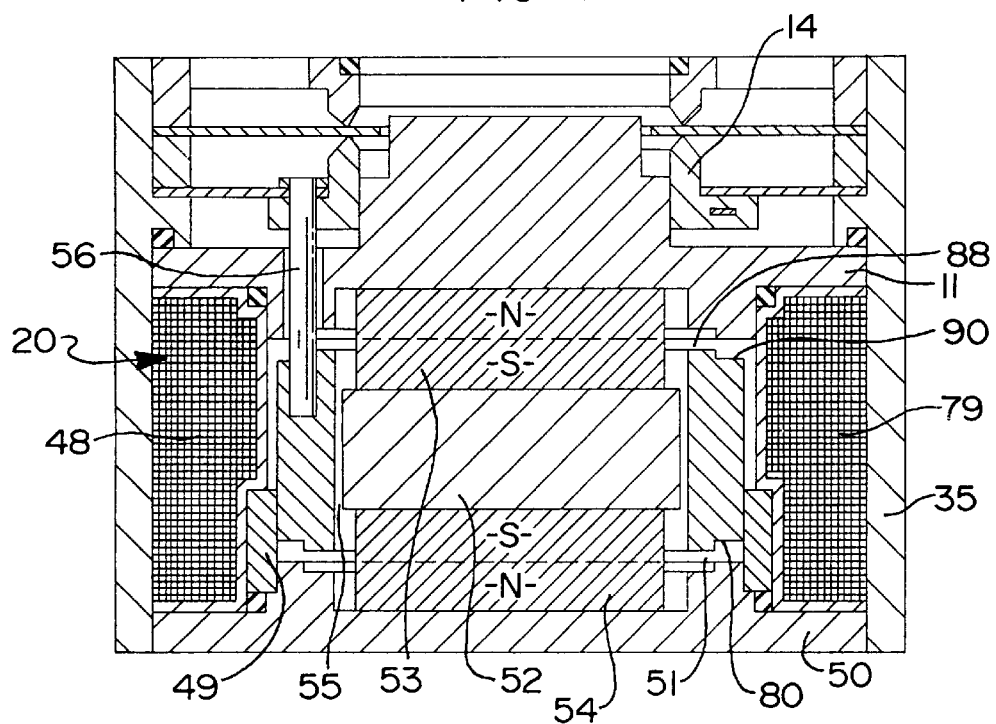

In the third preferred embodiment of the present invention shown in FIG. 4, the electromechanical transducer 20 is provided as a bidirectional, linear motor which, substantially, includes an electric coil 79 and an armature 48 which is axially movable within the coil 79. The armature 48, which is preferably of sleeve-shaped configuration, is guided at its end remote from the pilot member 14 in a sliding bushing 49, its axial overall length being sized such that axial air slots 51, 88 are formed between its stepped end surfaces 80, 90 and the guide element 11 or a pole plate 50 which axially abuts against the coil 79. The actuating force is transmitted to the pilot member 14 by connecting pins 56 which are guided with radial clearance in the guide element 11. Along with the guide element 11 and the pole plate 50, the sleeve-shaped armature 48 confines a cylindrical chamber in which two permanent magnets 53, 54 are arranged, which are magnetized in axially opposite directions and which are separated from each other by a pole shoe 52. In this configuration, preferably, the diameter of the pole shoe 52 has been selected to be such that a radial air slot 55 is formed between the pole shoe and the armature 48.

Figure 5:
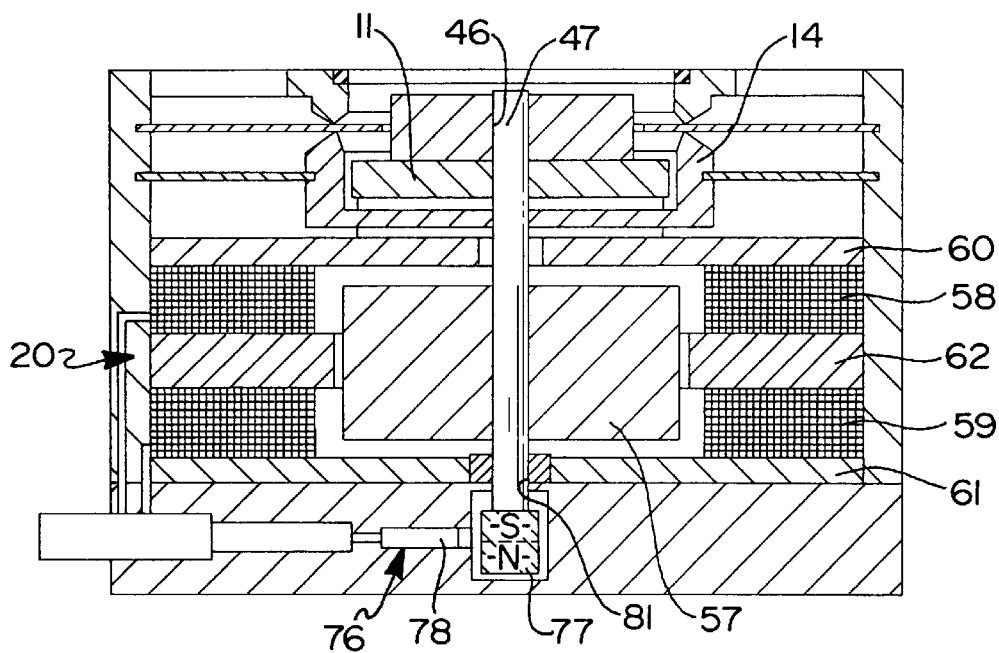

In the embodiment of the present invention shown in FIG. 5, the electromagnetical transducer 20 is a double lifting magnet which is composed of a centrically arranged armature 57 and two electric coils 58, 59 which embrace the armature 57 radially. On the one hand, the coils 58, 59 abut against a pole plate 60, 61 respectively and, on the other hand, against an annular pole shoe 62 interposed between the coils. The armature 57 is carried by a cylindrical part 47 connected to the pilot member 14, the end surface of which is exposed to the effect of the hydraulic pressure which prevails in the pilot chamber 23. The cylindrical part 47 may be guided, for example, in bores 46, 81 provided in the guide element 11 and in the bottom pole plate 61.

To achieve (in the vibration absorber shown in FIG. 1) a desired family of response characteristic (i.e. the hydraulic pressure prevailing in the vibration absorber depends on the fluid volume flowing through the absorber valve 10, with the energizing current driving the electromechanical transducer having different values) it is necessary to sense the actuating travel of the pilot member 14. To this end, a measuring device 76 is connected directly to the pilot member 14 and senses the variations in a magnetic field caused by the movement of the pilot member 14. The measuring device 76 shown in FIG. 5 includes a permanent magnet 77, attached to the cylindrical part 47, and a sensor element 78 interacting with the permanent magnet, for example a Hall effect element or a magnetoresistive element. However, other designs of the measuring device are also possible, for example, it may be a reflecting light barrier, or it may operate by the eddy-current principle.

In the embodiment shown in FIG. 6, the electromechanical transducer 20 is a so-called force motor, in which the coils 58, 59 mentioned with respect to FIG. 5 radially embrace two oppositely magnetized annular permanent magnets 63, 64. The disc-shaped armature 57 is positioned in a space confined by the coils 58, 59, the permanent magnets 63, 64 or the pole shoe 62, respectively.

Finally, the electromechanical transducer 20 used in the embodiment shown in FIG. 7 is a double lifting electromagnet having an armature 65 which is formed of a stepped cylindrical sleeve 66 suspended on a bending spring 71. The coil system of the double lifting magnet is formed of two coils 67, 68 which, preferably, are arranged such that the radially outwardly disposed first coil 67 of large diameter radially embraces the sleeve-shaped armature 65 or 66, while the second coil 68 of small diameter is arranged within the sleeve 66. Each of the two coils 67, 68 interacts with an annular pole core 72, 73, and a first radial air slot 74 is formed between the pole core 72 and the sleeve 66, and a second radial air slot 75 is formed between the pole core 73 and the sleeve 66. The axial length of the armature 65 is sized such that axial air slots 70, 89 result between its end surfaces 91, 92 and the guide element 11 or, respectively, a pole plate 69 which interacts with the second coil 68.

I claim:

1. A pilot valve for use in suspension control system comprising:
   a valve housing having a cover and a bottom plate;
   the cover of the valve housing having
      a first annular projection extending inwardly into the valve housing,
      an inlet aperture passing therethrough and located radially within the first annular projection, and
      an outlet aperture passing therethrough and located radially outside the first annular projection;
   a first flexible plate having a first side disposed against the first annular projection, having an outside diameter fixed to an inside diameter of the valve housing, having a first opening disposed radially within the first annular projection with the first opening defining a fixed throttling cross-section, and having a second opening disposed radially outside the first annular projection;
   a pilot member disposed within the valve housing and having a second annular projection disposed against a second side of the first flexible plate opposite to and in alignment with the first annular projection, the second annular projection defining a control edge engaging the first flexible plate;
   an electromechanical transducer within the valve housing located between the first flexible plate and the bottom plate and disposed between the pilot member and the valve housing and operably displacing the pilot member away from the first flexible plate to define a variable throttling cross-section between the control edge and the first flexible plate when the transducer is energized;
   a spring disposed between the pilot member and the housing biasing the control edge against the first flexible plate in a first operating position; and
   a guide element positioned in the valve housing for guiding the transducer; the guide element including at least one passageway to allow inlet fluid to act on the pilot member to maintain the pilot valve closed when the transducer is energized.

2. A pilot valve claimed in claim 1, wherein said the pilot member is guided on a preferably cylindrical guide element which is fixedly arranged in the valve housing.

3. A pilot valve as claimed in claim 2, wherein said guide element comprises radial grooves which open into a slot formed between the pilot member and the guide element, whereby the slot is made into a variable width shape to thereby allow for fluid pressure relief.

4. A pilot valve as claimed in claim 2 wherein said first flexible plate has an opening which receives an axial cylindrical extension of the guide element, the fixed throttling cross-section being formed by an annular slot between the valve member and the extension.

5. A pilot valve as claimed in claim 4, wherein said guide element includes an annular groove is provided proximate the fixed throttling cross-section.

6. A pilot valve as claimed in claim 4 further including a filter element connected upstream of the fixed throttling cross-section.

7. A pilot valve as claimed in claim 1, wherein said radially outwardly disposed annular fringe area of the plate is provided as a bending spring.

8. A pilot valve as claimed in claim 1, wherein the pilot member is suspended on a bending spring compressed in the valve housing.

9. A pilot valve as claimed in claim 1, wherein said plate has annular projections both in the range of effect of a sealing seat, controlling the first hydraulic connection, and in the range of effect of the pilot member.

10. A pilot valve as claimed in claim 1, wherein the area of the pilot member which interacts with the valve member forms a control edge of a triangular cross-section.

11. A pilot valve as claimed in claim 1, wherein the area of the pilot member interacting with the first flexible plate has a surface, to which the pressure prevailing in the pilot chamber is applied.

12. A pilot valve as claimed in claim 11, wherein said pilot member is pressure-balanced.

13. A pilot valve as claimed in claim 1, further including a preferably cylindrical part, interacting with the pilot member wherein the end surface of which may be subjected to the pressure prevailing in the pilot chamber.

14. A pilot valve as claimed claim 13, wherein the pilot member is connected to the measuring device by the cylindrical part.

15. A pilot valve as claimed in claim 1, wherein the electromechanical transducer is formed by a plunger coil, which interacts with a permanent magnet, the plunger coil having a carrier which forms the pilot member.

16. A pilot valve as claimed in claim 1, wherein the electromechanical transducer is a bidirectional linear motor, an armature of which is of sleeve-shaped design and mounted in a sliding bushing such that the axial air slots are provided between its ends and one of the guide element and a pull plate which closes the valve housing.

17. A pilot valve as claimed in claim 16, wherein the axial air slots are of stepped design in a radial direction.

18. A pilot valve as claimed in claim 16 wherein the chamber, bounded radially by the armature, accommodates two axially magnetized permanent magnets which are separated by a pole shoe, one of the permanent magnets abutting against the pole plate, while the other one abuts against the guide element, wherein a radial air slot is provided between the pole shoe and the armature.

19. A pilot valve as claimed in claim 16, wherein the armature is connected to the pilot member by means of connecting pins which extend through the guide element.

20. A pilot valve as claimed in claim 1, wherein the electromechanical transducer is a double lifting magnet, an armature of which cooperates with coils radially embracing the armature, one pole plate each and a pole shoe interposed in between, all elements being arranged side by side in an axial direction.

21. A pilot valve as claimed in claim 20, wherein the coils radially embrace two annular permanent magnets, magnetized in axially opposite directions, the armature being interposed between the permanent magnets.

22. A pilot valve as claimed in claim 1, wherein the electromechanical transducer is arranged as a double lifting magnet, an armature of which is provided as a cylindrical sleeve, its coils being arranged such that one coil is positioned radially outside the sleeve, while the other coil is positioned radially inside the sleeve.

23. A pilot valve as claimed in claim 22, wherein the sleeve is suspended on a bending spring, the ends of the sleeve forming axial air slots with the guide element or a pole plate which interacts with the radially inwardly disposed coil.

24. A pilot valve as claimed in claim 22 wherein the sleeve is interposed between pole cores, which are radially abutted against the coils, and forms radial air slots with the pole cores.

25. A pilot valve as claimed in claim 1, wherein the pilot member is connected to a measuring device which senses its actuating travel.

26. A pilot valve as claimed in claim 25, wherein the measuring device senses variations in magnetic variables which are caused by the shift in position of the pilot member.

27. A pilot valve as claimed in claim 26, wherein the measuring device is formed of a permanent magnet fitted to the pilot member connected to it, and a sensor element recording the magnetic field of the permanent magnet.

28. A pilot valve as claimed in claim 27, wherein the sensor element is a magnetoresistive element.

29. A pilot valve as claimed in claim 27, wherein the sensor element is formed from a Hall effect element.

30. A pilot valve as claimed in claim 25, wherein the measuring device is formed from a reflecting light barrier.

31. A pilot valve as claimed in claim 25, wherein the measuring device is provided as an arrangement working by the eddy-current principle.

32. A pilot valve as claimed in claim 1 wherein the fixed throttling cross-section is defined exclusively by the first opening in the first flexible plate.

33. A pilot valve as claimed in claim 1 wherein the fixed throttling cross-section is defined by a radial gap between the first opening in the flexible plate and the cylindrical element radially disposed within the first opening.

34. A pilot valve as claimed in claim 1 wherein the spring is defined by a second flexible plate radially fixed to both an inside diameter of the housing and an outside diameter of the pilot member biasing the control edge into engagement with the first flexible plate.

* * * * *